(12) United States Patent
Anderson et al.

(10) Patent No.: US 8,510,360 B2
(45) Date of Patent: Aug. 13, 2013

(54) CALCULATING LARGE PRECISION COMMON LOGARITHMS

(75) Inventors: Paul Anderson, The Hague (NL); Andrew H. Richter, Chapel Hill, NC (US); Grace A. Richter, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/794,340

(22) Filed: Jun. 4, 2010

(65) Prior Publication Data

US 2011/0302229 A1  Dec. 8, 2011

(51) Int. Cl.
G06F 1/02 (2006.01)

(52) U.S. Cl.
USPC .......................................... 708/277

(58) Field of Classification Search
USPC .......................... 708/277, 517, 201
See application file for complete search history.

(56) References Cited

U.S. PATENT DOCUMENTS

| 3,953,718 | A | | 4/1976 | Cooke |
| 4,001,569 | A | | 1/1977 | Dickinson et al. |
| 5,041,999 | A | * | 8/1991 | Nakayama ............... 708/277 |
| 5,570,310 | A | | 10/1996 | Smith |
| 6,289,367 | B1 | * | 9/2001 | Allred ............... 708/277 |
| 6,587,070 | B2 | | 7/2003 | Hallse |
| 6,588,699 | B2 | | 7/2003 | Klesadt et al. |
| 2009/0055005 | A1 | | 2/2009 | Oxman et al. |

FOREIGN PATENT DOCUMENTS

| JP | 63229524 | 9/1988 |
| JP | 2004164417 | 6/2004 |

OTHER PUBLICATIONS

Alexander Emil Clebowicz, "An Extension of the Johnson-Neyman Analysis to Three Matching Variables Applied to a Study of Two Methods of Determining the Characteristic of a Common Logarithm," Teachers College, Columbia University, 1957: pp. 1-153.

Gimpel et al., "Compute common logarithms on the 4-function calculator," EDN, Apr. 1975: pp. 72 and 74.

* cited by examiner

*Primary Examiner* — Tan V. Mai
(74) *Attorney, Agent, or Firm* — Patterson & Sheridan, LLP

(57) ABSTRACT

Techniques are disclosed for calculating large precision common logarithms. A common logarithm may be calculated using addition and/or subtraction of known logarithm values. Embodiments of the invention permit calculation of common logarithms of real numbers stored within character arrays, where each element of the array corresponds to a digit in the real number.

18 Claims, 2 Drawing Sheets

CALCULATING LARGE PRECISION COMMON LOGARITHMS

BACKGROUND

1. Field

Embodiments of the invention generally relate to computer implemented techniques for rapidly determining certain numerical values. More specifically, embodiments of the invention relate to techniques for calculating common logarithms to large precisions.

2. Description of the Related Art

In mathematics, a logarithm of a number to a given base is the power or exponent to which the base must be raised in order to produce that number. For example, the logarithm of 1000 to base 10 is 3. A logarithm with base 10 is generally known as a common logarithm. The fractional part of a logarithm is known as the "mantissa" or "significand"; the integer part is called the "characteristic". For example, the logarithm of 120 is written as $\log_{10} 120 = 2.07918125$, where 2 is the characteristic and 0.07918125 is the mantissa. One property of logarithms is multiplication may be reduced to addition: the logarithm of a product of two numbers is equal to the sum of the logarithm of the first number and the logarithm of the second number. That is, $\log(ab) = \log(a) + \log(b)$. Similarly, logarithms reduce division to subtraction: the logarithm of the quotient of two numbers is equal to the difference between the logarithm of the first number and the logarithm of the second number. That is, $$\log\left(\frac{a}{b}\right) = \log(a) - \log(b).$$

Logarithms have numerous applications, particularly in finance where some transactions require the use of logarithmic operations. In some contexts, financial data may be stored in a format or manner in which known and conventional methods of computing logarithms are inappropriate. In addition, calculation of logarithms may be limited to a certain precision due to constraints in hardware and/or software architecture. For example, double precision calculations provide precision up to $10^{17}$. A logarithm may be calculated for precision less than $10^{18}$ by using the following equation:

$$x = 889 * \left(y^{\frac{1}{2048}} - 1\right).$$

Logarithms needing precision greater than $10^{18}$ must be calculated through an alternative method.

SUMMARY

Embodiments of the invention provide methods, systems and computer program products for calculating a logarithm to a specified precision for a specified real value by determining an integer magnitude for the specified real value, shifting the specified real value by the determined integer magnitude, determining an interim result based on the shifted specified real value, and determining a precision value based on the shifted specified real value, further including, until a count of leading nine values in the precision value exceeds the specified precision, repeatedly, determining a next multiplier, determining a logarithm of the next multiplier, subtracting the determined logarithm of the next multiplier from the interim result, and multiplying the precision value by the next multiplier; and reporting the value of the interim result as the logarithm of the specified real value, wherein each real value is stored in a character array and wherein each element of the character array is a digit of the real value.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
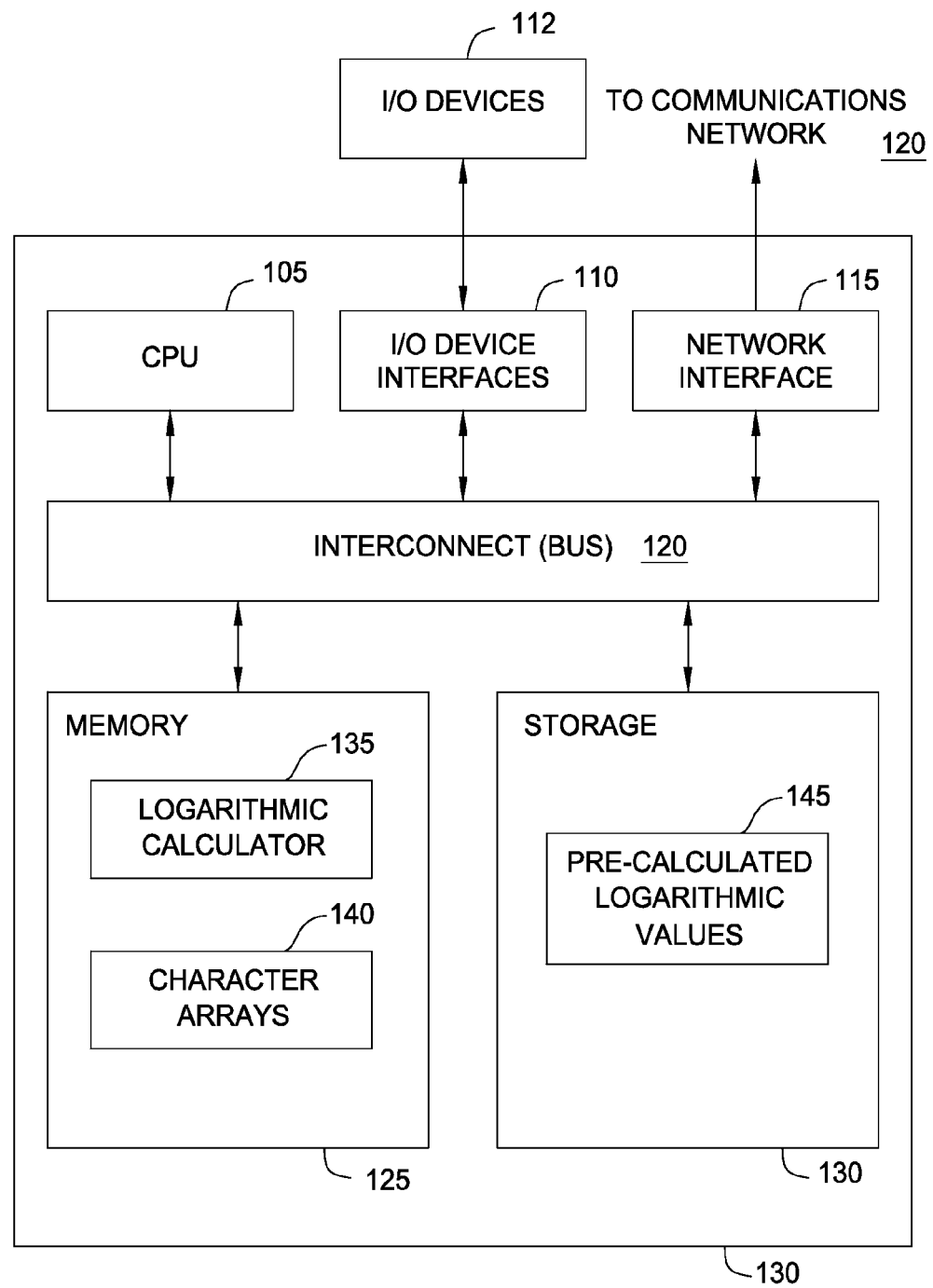
FIG. 1 illustrates a computing infrastructure configured to calculate common logarithms, according to one embodiment of the invention.

Embodiments of the invention provide techniques for calculating large precision logarithms. In particular, a method, system and computer program product is provided for calculating common logarithms of arbitrarily large precision using multiplication and subtraction. In one embodiment, a logarithm may be calculated for a real number stored as an array of characters, where each element of the array corresponds to a digit in the real number. The embodiment includes determining an initial estimate of the logarithmic value. The embodiment further provides successively subtracting known logarithmic values to approach the logarithmic value. The successive subtraction halts once it has been determined the logarithmic value reached is within a requested precision.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a computing infrastructure 100 configured to calculate common logarithms, according to one embodiment of the invention. As shown, the client computing system 130 includes, without limitation, a central processing unit (CPU) 105, a network interface 115, an interconnect 120, a memory 125, and storage 130. The computing system 130 may also include an I/O device interface 110 connecting I/O devices 112 (e.g., keyboard, display and mouse devices) to the computing system 105.

The CPU 105 retrieves and executes programming instructions stored in the memory 125. Similarly, the CPU 105 stores and retrieves application data residing in the memory 125. The interconnect 120 is used to transmit programming instructions and application data between the CPU 105, I/O devices interface 110, storage 130, network interface 115, and memory 125. CPU 105 is included to be representative of a single CPU, multiple CPUs, a single CPU having multiple processing cores, and the like. And the memory 125 is generally included to be representative of a random access memory. Storage 130, such as a hard disk drive or flash memory storage drive, may store non-volatile data.

Illustratively, the memory 125 includes a logarithm calculator 135 and a plurality of character arrays 140. The logarithm calculator 135 provides a software application which may calculate common logarithms to large precisions of numbers stored in character arrays. In one embodiment, real numbers may be stored in the plurality of character arrays 140, where each element of an array corresponds to a digit in a real number. As an example, the real number 123.45 may be stored in an array having at least 6 elements, the first element containing a '1', the second element containing a '2', the third element containing a '3', the fourth element containing the decimal point '.', and so forth. In one specific embodiment, an array of 128 characters may be used by the present invention to calculate and store a logarithmic value of a precision up to 64 decimal places. Use of a character array to store a number advantageously allows mathematical operations using a higher precision than allowed by conventional data types. Use of a character array also advantageously allows for compact storage in addition to efficient computer operations within memory.

In this example, the storage 130 includes a plurality of pre-calculated logarithmic values 145. In one embodiment, in one embodiment, a table of known logarithmic values for from n=−3 to n=45 may be included. For example, $\log_{10} 8$ may be pre-calculated to be 0.903089969 (full precision omitted), and stored in accessible memory or storage. In an alternative embodiment, a table of known logarithmic values for $$1 + \frac{1}{2^p}$$

may be used. In one aspect, the known logarithmic values are stored in character arrays.

Figure 2:
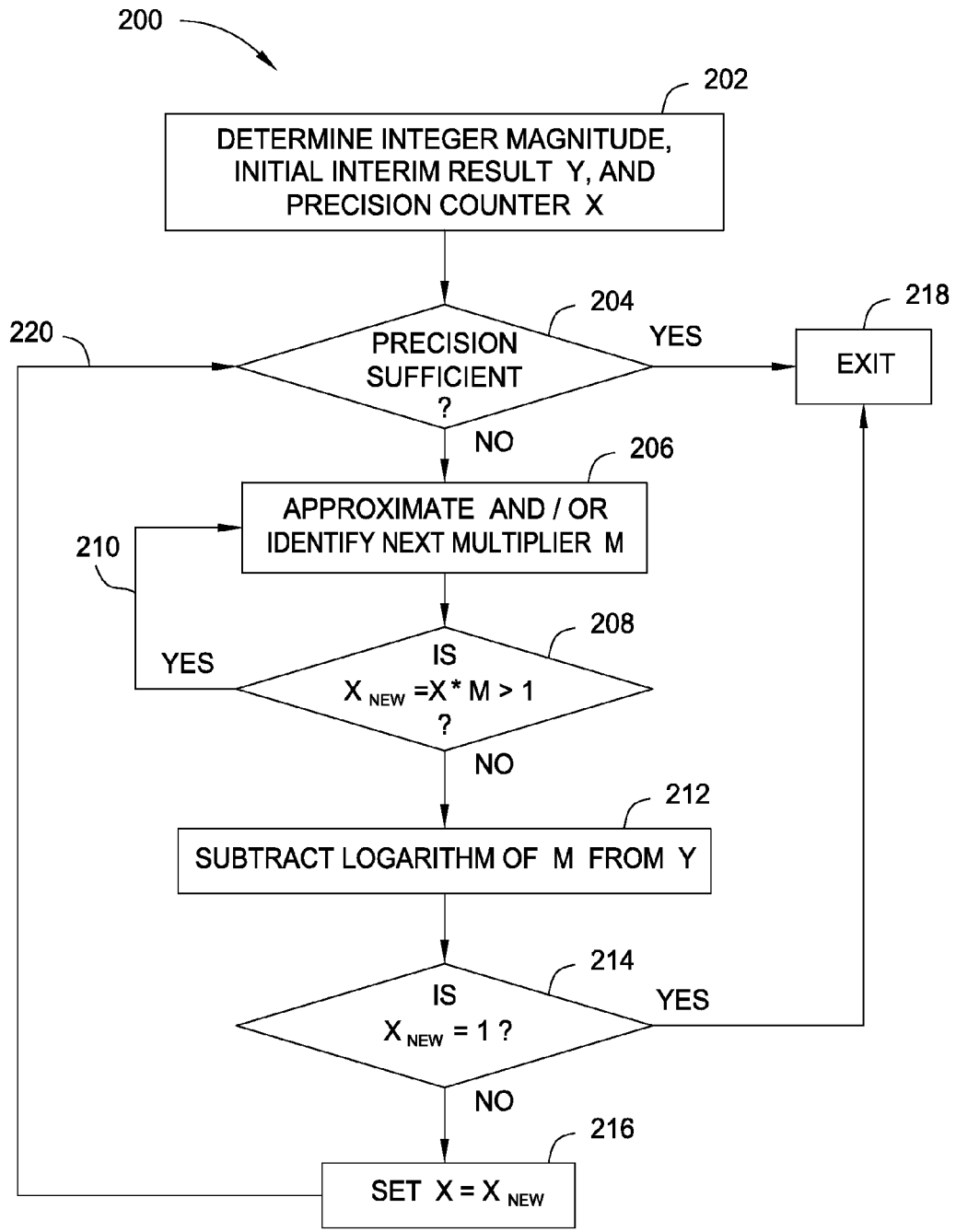
FIG. 2 illustrates a method for calculating common logarithms, according to one embodiment of the invention.

FIG. 2 illustrates a method 200 for calculating common logarithms of a real number according to one embodiment of the invention that may be performed by a computer device such as one described above. As shown, the method 200 begins at step 202, where an integer magnitude, an initial interim result Y, and a precision value X may be determined. As an example, a calculation of the common logarithm of the real number 123456.789 will be explained. Precision of temporary values may be truncated for readability.

In one embodiment, the arithmetic properties of logarithms may be utilized to break up the calculation of the common logarithm into parts. The calculation may be configured as a calculation of the characteristic, or integer magnitude, and a calculation of the mantissa, or decimal part. For example:

$$\begin{aligned}\log_{10}(12345.6789) &= \log_{10}(10^4 * 0.123456789) \\ &= \log_{10}(10^4) + \log_{10}(0.123456789) \\ &= 4 + \log_{10}(0.123456789)\end{aligned}$$

Conversely, the common logarithm may be expressed as a subtraction of logarithmic values. The calculation of the common logarithm may be separated into an overestimate of the characteristic, or integer magnitude, and a calculation of an adjustment term that would yield the mantissa, or decimal part, when subtracted from the overestimate. For example:

$$\begin{aligned}\log_{10}(12345.6789) &= \log_{10}(10^5/8.10000007) \quad (1)\\ &= \log_{10}(10^5) - \log_{10}(8.10000007) \\ &= 5 - \log_{10}(8.10000007)\end{aligned}$$

In one embodiment, the integer magnitude may be determined using a shift value, where the shift value is determined such that the real number, shifted a number of decimal places equal to the shift value, is less than 1. The real number may be shifted by the shift value and may be stored as A, a temporary value. For example, the shift value of real number 12345.6789 is determined to be 5. Real number 12345.6789 is shifted 5 decimal places and is stored as A=0.123456789. In this example, it can be said that common logarithm of 12345.6789 is determined to be less than 5. It is acknowledged that the shifting operation may be performed on a character array storing the real numbers.

The interim result Y contains a working value of the logarithm of the real number as successive iterations of the method are performed. In one embodiment, the interim result Y may be initialized, at step 202, by first dividing 1 by the temporary value X and taking the integer part B, the integer part B being greater than 1 and less than 10. Then, the common logarithm of the integer part B is determined. In one embodiment, the common logarithm is determined from a table of known logarithm values. Finally, the interim result Y may be initialized as the common logarithm of the integer part subtracted from the integer magnitude. In the example discussed, 1 divided by the temporary value A=0.123456789 is equal to 8.10000007. The integer part B is therefore 8. According to a table of known common logarithmic values, $\log_{10} 8$ is equal to 0.903089986. The interim result Y is equal to the shift value 5 minus 0.903089986, resulting in 4.096910013.

The precision value X contains an indication of the precision of actual logarithm value versus the interim result Y. The precision value X may be checked to determine whether iterations of the disclosed method should cease. In one embodiment, the precision value X may contain a ratio of the original decimal part to the decimal part covered by approximated values. Specifically, the precision value X may be initialized by dividing the temporary value A by one over the integer part B. In the example discussed, the precision value X is determined as 0.123456789/(1/8)=0.987654312. Each digit of '9' in the precision value represents 1 digit of precision.

Following step 202, a loop 220 begins wherein each iteration may increase precision of the logarithmic value. The loop begins at step 204 where the precision value X is checked to determine whether the calculated logarithmic value contains the specified degree of precision. In one embodiment, the method 200 determines whether the number of 9's found in the precision value X is greater than or equal to the degree of precision specified. If so, the method 200 exits at step 218, and the calculated logarithmic value is equal to the interim value Y. Otherwise, the method 200 proceeds to step 206. For example, if the specified degree of precision was $10^{-4}$ and the precision value Y was equal to 0.99999874, then the method 200 exits because the number of 9's equals 5, exceeding the specified degree of precision of 4.

At step 206, the method 200 may approximate and/or identify a next multiplier M. The next multiplier M may be a next iterative value whose common logarithmic value may be subtracted from the interim result Y. In one embodiment, the next multiplier M may comprise a value having the form $$1 + \frac{1}{2^p}.$$

The next multiplier M may be determined using a random selection or a predetermined selection based on an approximation heuristic. In one embodiment, the next multiplier M may be determined by calculating the largest $$1 + \frac{1}{2^p}$$

such that M multiplied by the precision value X does not exceed 1. In one embodiment, the next multiplier M may be such that the next multiplier M is smaller than previous values of M. In the example discussed, in a first pass of loop 220, the method 200 may approximate 1+1/128 as the next multiplier M.

Following step 206, the method 200 enters a validation loop 210 wherein the method 200 validates whether the next multiplier M places the calculated logarithmic value within convergence with the actual logarithmic value. In one embodiment, the next multiplier M is validated by determining whether M multiplied by the precision value X is greater than 1. If so, the method 200 returns to step 206 to determine a new next multiplier M. Otherwise, the method 200 proceeds to step 212. The result of the multiplication may be saved as $X_{new}$. In the example discussed, M*X is determined to be 0.9953703, which is less than 1, and thus proceeds to step 212. In an alternative instance of the example discussed, where the next multiplier M was determined to be 1+1/64, M*X=1.00308609>1, the method 200 would loop back to step 206. It is acknowledged that the multiplication found in step 208 may be a computer operation requiring significant resources. As such, it is acknowledged that method 200 may be further refined to reduce the occurrences of step 208, by at least reducing the iterations of the loop 210.

At step 212, the method 200 determines the common logarithm of the next multiplier M and then subtracts the common logarithm of M from the interim result Y. In one embodiment, the method 200 may determine the common logarithm of next multiplier $$M = 1 + \frac{1}{2^p}$$

by searching a table of known logarithmic values for the corresponding value. In the example discussed, the logarithm of 1+1/128, or 1.0078125, is determined to be 0.00337974065. As such, 0.00337974065 subtracted from the interim result Y of 4.096910013 equals 4.09353027, which is set as the new interim result Y.

At step 214, the method 200 determines whether the common logarithm has been exactly calculated. In one embodiment, the method 200 may determine whether the value $X_{new}$ is equal 1. If so, the method 200 has determined the logarithm has been precisely calculated and may exit at step 218. Otherwise, the method 200 proceeds to step 216 wherein the precision value X is set to $X_{new}$ to update the level of precision introduced by the current iteration of loop 220. In the example discussed, the new precision value is set to 0.9953703.

After step 216, the method 200 returns to step 204, wherein the method 200 determines whether sufficient precision has been calculated. In the example discussed, successive iterations of loop 220 determine next multiplier M values of 1+1/256, 1+1/2048, and 1+1/4096.

While the method described below discloses a method of calculating a common logarithm using a subtraction of parts, it is acknowledged that the common logarithm may also be calculated by the addition of parts as suggested above. In such an embodiment, the method may include determining an integer magnitude for the specified real value; storing, as an integer component of the logarithm, the determined integer magnitude minus one; shifting the specified real value by the determined integer magnitude; storing, as a current value, the shifted specified real value, wherein the current value is stored in a character array and wherein each element of the character array is a digit of the current value; and initializing an accumulator to zero. The method may further include, until a count of leading zero values in the current value exceeds the specified precision, repeatedly: determining a largest value of $$\frac{1}{2^n}$$

that is less than the current value, determining a logarithm of the largest value of $$\frac{1}{2^n};$$

adding the determined logarithm of the largest value of $$\frac{1}{2^n}$$

to the accumulator, and multiplying the current value by the largest value of $$\frac{1}{2^n}.$$

The method also may include reporting the sum of the integer component and the accumulator as the logarithm of the specified real value.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for calculating a logarithm to a specified precision for a specified real value, the method comprising performing operations on one or computer processors, comprising:
   determining an integer magnitude for the specified real value;
   shifting the specified real value by the determined integer magnitude;
   storing the shifted specified real value in a character array in a memory device, wherein each element of the character array is a digit of the real value;

determining, by operation of one or more processing units, an interim result based on the shifted specified real value;

determining a precision value based on the shifted specified real value;

until a count of leading nine values in the precision value exceeds the specified precision, repeatedly:
determining a next multiplier,
determining a logarithm of the next multiplier;
subtracting the determined logarithm of the next multiplier from the interim result, and
multiplying the precision value by the next multiplier; and reporting the value of the interim result as the logarithm of the specified real value.

2. The method of claim 1, wherein determining an interim result and a precision value comprises:
determining a second integer component of the quotient of one and the shifted specified real value,
determining a logarithm of the second integer component,
subtracting the determined logarithm of the second integer component from the integer magnitude, and storing the result as the interim result,
dividing the shifted specified real value by the quotient of one and the second integer component, and
storing the result as the precision value.

3. The method of claim 1, wherein determining a logarithm comprises referencing a plurality of known logarithm values.

4. The method of claim 1, wherein the next multiplier has a form comprising $$1 + \frac{1}{2^n},$$

and has a value less than a previous multiplier.

5. The method of claim 1, wherein determining the next multiplier comprises approximating the next multiplier, such that the product of the next multiplier and the precision value does not exceed 1.

6. The method of claim 1, wherein determining the next multiplier comprises approximating the next multiplier based on a predetermined heuristic.

7. A computer readable storage medium containing a computer program product comprising:
computer readable program code to determine an integer magnitude for the specified real value;
computer readable program code to shift the specified real value by the determined integer magnitude;
computer readable program code to store the shifted specified real value in a character array, wherein each element of the character array is a digit of the real value;
computer readable program code to determine an interim result based on the shifted specified real value;
computer readable program code to determine a precision value based on the shifted specified real value;
computer readable program code to, until a count of leading nine values in the precision value exceeds the specified precision, repeatedly:
determine a next multiplier,
determine a logarithm of the next multiplier;
subtract the determined logarithm of the next multiplier from the interim result, and
multiply the precision value by the next multiplier; and
computer readable program code to report the value of the interim result as the logarithm of the specified real value.

8. The computer readable storage medium of claim 7, wherein the computer readable program code to determine the interim result and the precision value further comprises:
computer readable program code to determine a second integer component of the quotient of one and the shifted specified real value,
computer readable program code to determine a logarithm of the second integer component,
computer readable program code to subtract the determined logarithm of the second integer component from the integer magnitude, and storing the result as the interim result,
computer readable program code to divide the shifted specified real value by the quotient of one and the second integer component, and
computer readable program code to store storing the result as the precision value.

9. The computer readable storage medium of claim 7, wherein the computer readable program code to determine a logarithm comprises computer readable program code to reference a plurality of known logarithm values.

10. The computer readable storage medium of claim 7, wherein the next multiplier has a form comprising $$1 + \frac{1}{2^n},$$

and has a value less than a previous multiplier.

11. The computer readable storage medium of claim 7, wherein the computer readable program code to determine the next multiplier comprises:
computer readable program code to approximate the next multiplier, such that the product of the next multiplier and the precision value does not exceed 1.

12. The computer readable storage medium of claim 7, wherein the computer readable program code to determine the next multiplier comprises:
computer readable program code to approximate the next multiplier based on a predetermined heuristic.

13. A system, comprising:
a processor;
a storage repository; and
a memory storing a logarithm component, which when executed on the processor is configured to perform an operation, comprising:
determining an integer magnitude for the specified real value;
shifting the specified real value by the determined integer magnitude;
determining an interim result based on the shifted specified real value;
determining a precision value based on the shifted specified real value;
until a count of leading nine values in the precision value exceeds the specified precision, repeatedly:
determining a next multiplier,
determining a logarithm of the next multiplier;
subtracting the determined logarithm of the next multiplier from the interim result, and
multiplying the precision value by the next multiplier; and
reporting the value of the interim result as the logarithm of the specified real value, wherein each real value is stored in a character array and wherein each element of the character array is a digit of the real value.

14. The system of claim 13, wherein determining an interim result and a precision value comprises:
   determining a second integer component of the quotient of one and the shifted specified real value,
   determining a logarithm of the second integer component,
   subtracting the determined logarithm of the second integer component from the integer magnitude, and storing the result as the interim result,
   dividing the shifted specified real value by the quotient of one and the second integer component, and
   storing the result as the precision value.

15. The system of claim 13, wherein determining a logarithm comprises referencing a plurality of known logarithm values.

16. The system of claim 13, wherein the next multiplier has a form comprising $$1 + \frac{1}{2^n},$$

and has a value less than a previous multiplier.

17. The system of claim 13, wherein determining the next multiplier comprises approximating the next multiplier, such that the product of the next multiplier and the precision value does not exceed 1.

18. The system of claim 13, wherein determining the next multiplier comprises approximating the next multiplier based on a predetermined heuristic.

* * * * *